United States Patent
Takahata

(10) Patent No.: US 10,218,035 B2
(45) Date of Patent: Feb. 26, 2019

(54) NONAQUEOUS ELECTROLYTE SECONDARY BATTERY, BATTERY ASSEMBLY, AND METHOD OF MANUFACTURING THE SAME

(71) Applicant: TOYOTA JIDOSHA KABUSHIKI KAISHA, Toyota-shi, Aichi-ken (JP)

(72) Inventor: Koji Takahata, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/539,247

(22) PCT Filed: Dec. 23, 2015

(86) PCT No.: PCT/IB2015/002413
§ 371 (c)(1),
(2) Date: Jun. 23, 2017

(87) PCT Pub. No.: WO2016/103023
PCT Pub. Date: Jun. 30, 2016

(65) Prior Publication Data
US 2018/0026314 A1      Jan. 25, 2018

(30) Foreign Application Priority Data

Dec. 26, 2014      (JP) .................................. 2014-266674

(51) Int. Cl.
*H01M 10/42* (2006.01)
*H01M 10/0567* (2010.01)
(Continued)

(52) U.S. Cl.
CPC ......... *H01M 10/4235* (2013.01); *H01M 4/13* (2013.01); *H01M 4/505* (2013.01);
(Continued)

(58) Field of Classification Search
CPC ............. H01M 10/42; H01M 10/4235; H01M 10/0567; H01M 10/058; H01M 4/525;
(Continued)

(56) References Cited

U.S. PATENT DOCUMENTS

2012/0007560 A1    1/2012  Smart et al.
2012/0313570 A1    12/2012 Ohtaniuchi et al.

FOREIGN PATENT DOCUMENTS

| EP | 2706599 A1 * | 3/2014 | ............ H01M 4/131 |
| JP | 2002-252038 A | 9/2002 | |
| JP | 2012-256502 A | 12/2012 | |
| JP | 2013-65409 A | 4/2013 | |

(Continued)

*Primary Examiner* — Karie O'Neill Apicella
(74) *Attorney, Agent, or Firm* — Sughrue Mion, PLLC

(57) ABSTRACT

Provided is a method of manufacturing a nonaqueous electrolyte secondary battery, the method including: constructing a battery assembly by using a positive electrode containing N-methyl-2-pyrrolidone and a nonaqueous electrolytic solution containing an oxalato complex compound. In the method, the battery assembly is constructed such that a following expression of $0.000036 \leq B_1/A_1 \leq 0.001048$ is satisfied, where $A_1$ (ppm) represents a content of N-methyl-2-pyrrolidone per unit mass of a positive electrode active material layer, and $B_1$ (mol/kg) represents a content of the oxalato complex compound per unit mass of a negative electrode active material.

7 Claims, 5 Drawing Sheets

(51) Int. Cl.
    *H01M 10/0569*    (2010.01)
    *H01M 10/058*     (2010.01)
    *H01M 4/525*      (2010.01)
    *H01M 4/587*      (2010.01)
    *H01M 4/505*      (2010.01)
    *H01M 4/62*       (2006.01)
    *H01M 4/13*       (2010.01)
    *H01M 10/04*     (2006.01)

(52) U.S. Cl.
    CPC ........... *H01M 4/525* (2013.01); *H01M 4/587* (2013.01); *H01M 4/62* (2013.01); *H01M 4/623* (2013.01); *H01M 4/625* (2013.01); *H01M 10/049* (2013.01); *H01M 10/058* (2013.01); *H01M 10/0567* (2013.01); *H01M 10/0569* (2013.01); *H01M 2220/20* (2013.01); *H01M 2300/004* (2013.01); *H01M 2300/0025* (2013.01)

(58) Field of Classification Search
    CPC ........ H01M 4/587; H01M 4/505; H01M 4/62; H01M 4/623; H01M 4/625
    See application file for complete search history.

(56) References Cited

FOREIGN PATENT DOCUMENTS

| | | |
|---|---|---|
| JP | 2013-165049 A | 8/2013 |
| JP | 2013-254698 A | 12/2013 |
| JP | 2014-022328 A | 2/2014 |
| JP | 2014-137878 A | 7/2014 |

\* cited by examiner

FIG. 3

TABLE 1 HEAT DRYING CONDITIONS (TEMPERATURE AND TIME) OF POSITIVE ELECTRODE AND AMOUNT (ppm) oF NMP REMAINING

| | C1 | C2 | C3 | C4 | C5 | C6 | C7 | C8 | C9 | C10 | C11 | C12 | C13 |
|---|---|---|---|---|---|---|---|---|---|---|---|---|---|
| TEMPERATURE (°C) | REFERENCE | 0 | -5 | -5 | -10 | -15 | -20 | -25 | -25 | -30 | -35 | -40 | -45 |
| TIME (hr) | REFERENCE | -0.5 | -1 | -1.5 | -1.5 | -3 | -3 | -3 | -3.5 | -4 | -4 | -4 | -4 |
| CONTENT OF NMP (ppm) | 23 | 33 | 41 | 46 | 83 | 173 | 356 | 477 | 512 | 551 | 710 | 990 | 1023 |

FIG. 4

TABLE 2  $B_1/A_1$ IN TEST EXAMPLES IN WHICH LiBOB WAS USED

| | | $A_1$ (ppm) | | | | | | | | | | | |
|---|---|---|---|---|---|---|---|---|---|---|---|---|---|
| | | C1 | C2 | C3 | C4 | C5 | C6 | C7 | C8 | C9 | C10 | C11 | C12 | C13 |
| $B_1/A_1$ | | 23 | 33 | 41 | 46 | 83 | 173 | 356 | 477 | 512 | 551 | 710 | 990 | 1023 |
| E1 | 0.0172 | 0.000749 | 0.000522 | 0.000420 | 0.000374 | 0.000207 | 0.000100 | 0.000048 | 0.000036 | 0.000034 | 0.000031 | 0.000024 | 0.000017 | 0.000017 |
| E2 | 0.0207 | 0.000898 | 0.000626 | 0.000504 | 0.000449 | 0.000249 | 0.000119 | 0.000058 | 0.000043 | 0.000040 | 0.000038 | 0.000029 | 0.000021 | 0.000020 |
| E3 | 0.0258 | 0.001123 | 0.000783 | 0.000630 | 0.000562 | 0.000311 | 0.000149 | 0.000073 | 0.000054 | 0.000050 | 0.000047 | 0.000036 | 0.000026 | 0.000025 |
| E4 | 0.0396 | 0.001722 | 0.001200 | 0.000966 | 0.000861 | 0.000477 | 0.000229 | 0.000111 | 0.000083 | 0.000077 | 0.000072 | 0.000056 | 0.000040 | 0.000039 |
| E5 | 0.0482 | 0.002096 | 0.001461 | 0.001176 | 0.001048 | 0.000581 | 0.000279 | 0.000135 | 0.000101 | 0.000094 | 0.000088 | 0.000068 | 0.000049 | 0.000047 |
| E6 | 0.0689 | 0.002995 | 0.002087 | 0.001680 | 0.001497 | 0.000830 | 0.000398 | 0.000193 | 0.000144 | 0.000135 | 0.000125 | 0.000097 | 0.000070 | 0.000067 |
| E7 | 0.1033 | 0.004492 | 0.003131 | 0.002520 | 0.002246 | 0.001245 | 0.000597 | 0.000290 | 0.000217 | 0.000202 | 0.000188 | 0.000146 | 0.000104 | 0.000101 |
| E8 | 0.1378 | 0.005990 | 0.004175 | 0.003360 | 0.002995 | 0.001660 | 0.000796 | 0.000387 | 0.000289 | 0.000269 | 0.000250 | 0.000194 | 0.000139 | 0.000135 |
| E9 | 0.1722 | 0.007487 | 0.005218 | 0.004200 | 0.003744 | 0.002075 | 0.000995 | 0.000484 | 0.000361 | 0.000336 | 0.000313 | 0.000243 | 0.000174 | 0.000168 |
| E10 | 0.2066 | 0.008984 | 0.006262 | 0.005040 | 0.004492 | 0.002490 | 0.001194 | 0.000580 | 0.000433 | 0.000404 | 0.000375 | 0.000291 | 0.000209 | 0.000202 |
| $B_1$ (mol/kg) | | | | | | | | | | | | | | |

FIG. 5

TABLE 3  CAPACITY LOSS 1 AFTER HIGH-TEMPERATURE STORAGE TEST

| | | | | | | | | $A_1$ (ppm) | | | | | | | |
|---|---|---|---|---|---|---|---|---|---|---|---|---|---|---|---|
| | | | C1 | C2 | C3 | C4 | C5 | C6 | C7 | C8 | C9 | C10 | C11 | C12 | C13 |
| | CAPACITY LOSS (Ah) | | 23 | 33 | 41 | 46 | 83 | 173 | 356 | 477 | 512 | 551 | 710 | 990 | 1023 |
| $B_1$ (mol/kg) | E1 | 0.0172 | 0.67 | 0.67 | 0.68 | 0.67 | 0.66 | 0.65 | 0.67 | 0.68 | 0.71 | 0.74 | 0.75 | 0.77 | 0.78 |
| | E2 | 0.0207 | 0.65 | 0.66 | 0.66 | 0.66 | 0.67 | 0.65 | 0.64 | 0.67 | 0.72 | 0.72 | 0.73 | 0.75 | 0.82 |
| | E3 | 0.0258 | 0.62 | 0.49 | 0.47 | 0.49 | 0.44 | 0.43 | 0.43 | 0.44 | 0.47 | 0.49 | 0.49 | 0.58 | 0.64 |
| | E4 | 0.0396 | 0.60 | 0.6 | 0.46 | 0.47 | 0.46 | 0.43 | 0.45 | 0.46 | 0.47 | 0.46 | 0.49 | 0.57 | 0.66 |
| | E5 | 0.0482 | 0.59 | 0.59 | 0.57 | 0.5 | 0.47 | 0.45 | 0.45 | 0.47 | 0.49 | 0.49 | 0.48 | 0.59 | 0.62 |
| | E6 | 0.0689 | 0.57 | 0.56 | 0.54 | 0.54 | 0.48 | 0.46 | 0.47 | 0.45 | 0.46 | 0.46 | 0.47 | 0.54 | 0.63 |
| | E7 | 0.1033 | 0.57 | 0.56 | 0.55 | 0.56 | 0.55 | 0.44 | 0.46 | 0.44 | 0.45 | 0.47 | 0.46 | 0.55 | 0.64 |
| | E8 | 0.1378 | 0.56 | 0.55 | 0.53 | 0.58 | 0.56 | 0.5 | 0.49 | 0.43 | 0.45 | 0.49 | 0.49 | 0.58 | 0.65 |
| | E9 | 0.1722 | 0.56 | 0.57 | 0.56 | 0.57 | 0.58 | 0.59 | 0.58 | 0.56 | 0.55 | 0.58 | 0.59 | 0.56 | 0.59 |
| | E10 | 0.2066 | 0.56 | 0.56 | 0.57 | 0.57 | 0.56 | 0.58 | 0.57 | 0.55 | 0.56 | 0.57 | 0.59 | 0.55 | 0.58 |

FIG. 6

TABLE 4  $B_1/A_1$ IN TEST EXAMPLES IN WHICH LPFO WAS USED

| $B_1/A_1$ | | | $A_1$ (ppm) | | |
|---|---|---|---|---|---|
| | | | C7 | C10 | C13 |
| | | | 356 | 551 | 1023 |
| $B_1$ (mol/kg) | E11 | 0.0172 | 0.000048 | 0.000031 | 0.000017 |
| | E12 | 0.0431 | 0.000121 | 0.000078 | 0.000042 |
| | E13 | 0.1033 | 0.000290 | 0.000187 | 0.000101 |
| | E14 | 0.1722 | 0.000484 | 0.000313 | 0.000168 |

FIG. 7

TABLE 5  CAPACITY LOSS 2 AFTER HIGH-TEMPERATURE STORAGE TEST

| CAPACITY LOSS (Ah) | | | $A_1$ (ppm) | | |
|---|---|---|---|---|---|
| | | | C7 | C10 | C13 |
| | | | 356 | 551 | 1023 |
| $B_1$ (mol/kg) | E11 | 0.0172 | 0.72 | 0.73 | 0.8 |
| | E12 | 0.0431 | 0.47 | 0.49 | 0.65 |
| | E13 | 0.1033 | 0.47 | 0.46 | 0.67 |
| | E14 | 0.1722 | 0.57 | 0.59 | 0.62 |

NONAQUEOUS ELECTROLYTE SECONDARY BATTERY, BATTERY ASSEMBLY, AND METHOD OF MANUFACTURING THE SAME

CROSS REFERENCE TO RELATED APPLICATIONS

This application is a National Stage of International Application No. PCT/IB2015/002413 filed Dec. 23, 2015, claiming priority based on Japanese Patent Application No. 2014-266674 filed Dec. 26, 2014, the contents of all of which are incorporated herein by reference in their entirety.

BACKGROUND OF THE INVENTION

1. Field of the Invention

The present invention relates to a nonaqueous electrolyte secondary battery and a method of manufacturing the same.

2. Description of Related Art

In a nonaqueous electrolyte secondary battery such as a lithium ion battery, a nonaqueous electrolytic solution contains a film forming agent, for example, in order to improve durability. In such a battery, typically, the film forming agent is electrically decomposed (typically reduced and decomposed) during initial charging. A film is stably formed on a surface of an active material (typically, a negative electrode active material). As a result, the decomposition of the nonaqueous electrolytic solution and deterioration of an active material can be suppressed, and the durability of the battery can be improved. Examples of prior art documents relating to this configuration include Japanese Patent Application Publication No. 2013-165049 (JP 2013-165049 A) and Japanese Patent Application Publication No. 2014-137878 (JP 2014-137878 A). For example, JP 2013-165049 A discloses a technique in which an oxalato complex compound is used as a film forming agent.

SUMMARY OF THE INVENTION

However, according to the investigation by the present inventors, in consideration of long term durability of, for example, about 10 years, it was found that there is room for improvement in the above-described technique. The invention provides: a nonaqueous electrolyte secondary battery having superior durability in which effects obtained by the addition of a film forming agent are fully exhibited; and a method of stably manufacturing the battery.

The present inventors conceived optimization of characteristics (amount or quality) of a film which is formed on a surface of an active material (typically, a negative electrode active material). As a result of a thorough study, the present invention has been completed. According to a first aspect of the invention, there is provided a method of manufacturing a nonaqueous electrolyte secondary battery, the method including the following steps (1) to (3) of: (1) preparing a positive electrode that includes a positive electrode active material layer containing a positive electrode active material and N-methyl-2-pyrrolidone, a negative electrode that includes a negative electrode active material layer containing a negative electrode active material, and a nonaqueous electrolytic solution that contains an oxalato complex compound; (2) constructing a battery assembly using the positive electrode, the negative electrode, and the nonaqueous electrolytic solution; and (3) initially charging the battery assembly. In the method, the battery assembly is constructed such that a following expression of $0.000036 \leq B_1/A_1 \leq 0.001048$ is satisfied, where $A_1$ (ppm) represents a content of N-methyl-2-pyrrolidone per unit mass of the positive electrode active material layer, and $B_1$ (mol/kg) represents a content of the oxalato complex compound per unit mass of the negative electrode active material.

In the method disclosed herein, the battery assembly is initially charged in a state where the battery assembly contains N-methyl-2-pyrrolidone (hereinafter, also referred to as "NMP") and the oxalato complex compound which satisfy the above expression. Thus, a film containing a component derived from NMP and a component derived the oxalato complex compound is formed on a surface of the active material (typically, the negative electrode active material). As a result, a battery having higher durability (for example, high-temperature storage characteristics) can be realized compared to, for example, a case where a film containing only the oxalato complex compound is formed on a surface of the active material.

In general, the amount of NMP is reduced as much as possible before the construction of a battery. Examples of prior art documents relating to this configuration include Japanese Patent Application Publication No. 2002-252038 (JP 2002-252038 A) and Japanese Patent Application Publication No. 2013-254698 (JP 2013-254698 A). JP 2002-252038 A and JP 2013-254698 A disclose techniques of reducing the content of NMP in an electrode to improve self-discharge characteristics (JP 2002-252038 A) and to reduce the resistance of the electrode (JP 2013-254698 A). On the other hand, in the technique disclosed herein, intentionally, an appropriate amount of NMP is caused to remain in the positive electrode active material layer. NMP is used to modify a film derived from the oxalato complex compound. That is, in the technique disclosed herein, NMP functions as a so-called film modifier. As a result, an effect of improving durability, which cannot be realized in a battery containing either NMP or the oxalato complex compound, can be exhibited.

In the method disclosed herein, $A_1$ may be adjusted to be 33 ppm to 710 ppm. As a result, the effects of the invention are more efficiently exhibited. In the method disclosed herein, $B_1$ may be adjusted to be 0.0258 mol/kg to 0.1378 mol/kg. As a result, the effects of the invention are more efficiently exhibited.

In the method disclosed herein, particles having a hollow structure may be used as the positive electrode active material, the hollow structure including: a shell portion; and a hollow portion that is formed in the shell portion. In the positive electrode active material having the above-described configuration, the hollow portions can hold NMP. Therefore, this configuration is preferable from the viewpoint of controlling the content of NMP in the positive electrode active material layer.

In the method disclosed herein, at least one of lithium bis(oxalato)borate (LiBOB) and lithium difluorobis(oxalato)phosphate (LPFO) may be used as the oxalato complex compound. As a result, a film having high durability can be formed on a surface of the active material. Therefore, the effects of the invention can be exhibited at a higher level.

According to a second aspect of the invention, there is provided a battery assembly including: a positive electrode that includes a positive electrode active material layer containing a positive electrode active material and N-methyl-2-pyrrolidone; a negative electrode that includes a negative electrode active material layer containing a negative electrode active material; and a nonaqueous electrolytic solution that contains an oxalato complex compound. In the battery assembly, a following expression of $0.000036 \leq B_2/A_{2'} \leq 0.001048$ is satisfied, where $A_{2'}$ (ppm) represents a content of N-methyl-2-pyrrolidone per unit mass in one of five regions which is most distant from the negative electrode, the five regions being equally divided from the positive electrode active material layer in a thickness direction, and $B_2$ (mol/kg) represents a content of the oxalato complex compound per unit mass of the negative electrode active material. In the battery assembly having the above-described configuration (assembly which does not undergo an electrochemical treatment), a high-quality film is formed on a surface of the active material through initial charging. Therefore, a nonaqueous electrolyte secondary battery having superior durability can be realized.

In this configuration, "containing N-methyl-2-pyrrolidone" represents that N-methyl-2-pyrrolidone is at least contained intentionally during the preparation of a battery. For example, N-methyl-2-pyrrolidone which is used as a solvent in order to form the positive electrode active material layer is intentionally (actively) caused to remain in the positive electrode active material layer without completely removing N-methyl-2-pyrrolidone. For example, in the battery assembly, a content $A_2$ of N-methyl-2-pyrrolidone per unit mass of the positive electrode active material layer is 16 ppm or higher, preferably 20 ppm or higher, and more preferably 23 ppm or higher (for example, 50 ppm or higher, 100 ppm or higher, 200 ppm or higher, and in particular, 300 ppm or higher). In addition, in the nonaqueous electrolyte secondary battery, a content $A_3$ of N-methyl-2-pyrrolidone per unit mass of the positive electrode active material layer is 2 ppm or higher, preferably 3 ppm or higher, and more preferably 7 ppm or higher (for example, 10 ppm or higher, 20 ppm or higher, 50 ppm or higher, and in particular, 100 ppm or higher).

According to a third aspect of the invention, there is provided a nonaqueous electrolyte secondary battery including: a positive electrode that includes a positive electrode active material layer containing a positive electrode active material; a negative electrode that includes a negative electrode active material layer containing a negative electrode active material; and a nonaqueous electrolytic solution. The negative electrode active material includes a film. The film contains a component derived from an oxalato complex compound and a component derived from N-methyl-2-pyrrolidone. By the negative electrode active material containing a film which contains the two components, the decomposition of the nonaqueous electrolytic solution can be suppressed at a high level. Therefore, in the nonaqueous electrolyte secondary battery having the above-described configuration, for example, even when being used or stored in a high-temperature environment for a long period of time, a decrease in capacity retention is small. That is, superior durability can be realized.

In the nonaqueous electrolyte secondary battery disclosed herein, the positive electrode active material layer may contain N-methyl-2-pyrrolidone, and the nonaqueous electrolytic solution may contain an oxalato complex compound. As a result, for example, even when an unexpected situation such as the cracking of the negative electrode active material or the peeling of the negative electrode active material layer occurs, a new film can be formed on the exposed surface of the negative electrode active material. Therefore, the effects of the invention can be exhibited at a higher level.

In the nonaqueous electrolyte secondary battery disclosed herein, the positive electrode active material may have a hollow structure including: a shell portion; and a hollow portion that is formed in the shell portion. With the above-described configuration, the hollow portions can hold NMP. Therefore, the positive electrode active material layer can stably contain NMP.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a table showing heat drying conditions (temperature and time) of a positive electrode and the amount (ppm) of NMP remaining;

FIG. 4 is a table showing $B_1/A_1$ in each of test examples in which LiBOB was used;

FIG. 5 is a table showing Capacity Loss 1 after a high-temperature storage;

FIG. 6 is a table showing $B_1/A_1$ in each of test examples in which LPFO was used; and FIG. 7 is a table showing Capacity Loss 2 after a high-temperature storage.

DETAILED DESCRIPTION OF EMBODIMENTS

Figure 1:
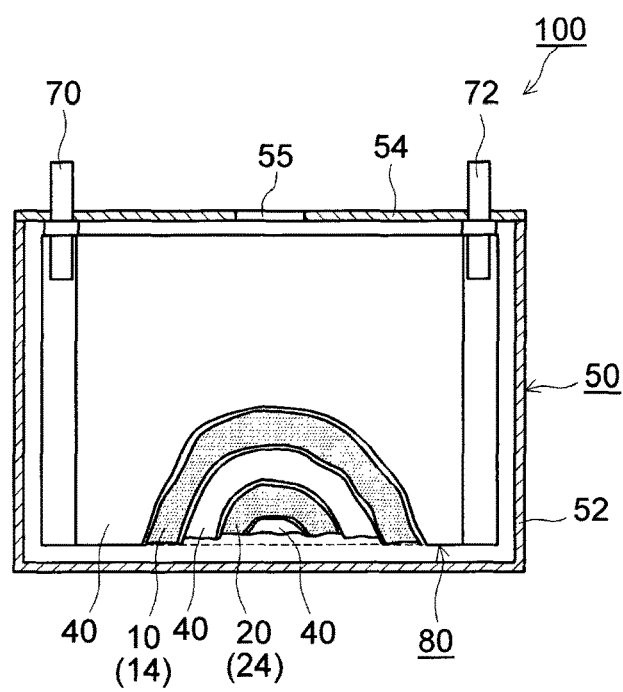
FIG. 1 is a schematic view showing a sectional structure of a nonaqueous electrolyte secondary battery according to an embodiment of the invention.

Preferred embodiments of the invention are described below. Matters (for example, components or a general manufacturing process of a battery which is not a characteristic of the invention) necessary to practice this invention other than those specifically referred to in this specification may be understood as design matters based on the related art in the pertinent field for a person of ordinary skill in the art. The invention can be practiced based on the contents disclosed in this specification and common technical knowledge in the pertinent field.

<Method of Manufacturing Nonaqueous Electrolyte Secondary Battery>

A method of manufacturing a nonaqueous electrolyte secondary battery disclosed herein includes, roughly, (1) a preparation step, (2) a battery assembly construction step, and (3) an initial charging step. In addition to these steps, the method may further include another step at an arbitrary stage. Hereinafter, each step will be sequentially described.

<(1) Preparation Step>

In the preparation step, (a) a positive electrode, (b) a negative electrode, and (c) a nonaqueous electrolytic solution are prepared.

(a) Positive Electrode

The positive electrode includes a positive electrode active material layer. Typically, the positive electrode includes a positive electrode current collector and a positive electrode active material layer attached to the positive electrode current collector. The positive electrode active material layer contains a positive electrode active material and N-methyl-2-pyrrolidone (NMP). As the positive electrode current collector, a conductive member formed of highly conductive metal (for example, aluminum or nickel) can be preferably used.

As the positive electrode active material, one kind or two or more kinds can be appropriately selected and used among various known materials which can be used as a positive electrode active material of a nonaqueous electrolyte secondary battery. Preferable examples of the positive electrode active material include lithium transition metal composite oxides such as $LiNiO_2$, $LiCoO_2$, $LiFeO_2$, $LiMn_2O_4$, and $LiNi_{0.5}Mn_{1.5}O_4$. Among these, a lithium nickel cobalt manganese composite oxide having a layered structure is preferably used from the viewpoint of improving thermal stability and energy density.

The form of the positive electrode active material to be used is not particularly limited but, typically, is a particulate form. The average particle size of the positive electrode active material may be about 0.5 μm to 20 μm (typically, 1 μm to 15 μm; for example, 5 μm to 10 μm). In this specification, "average particle size" refers to a particle size (also referred to as "$D_{50}$" or "median size") corresponding to a cumulative frequency of 50 vol % in order from the smallest particle size in a volume particle size distribution based on a general laser diffraction laser scattering method.

In a preferred embodiment, a material having a DBP absorption number of 30 ml/100 g to 50 ml/100 g is used as the positive electrode active material. When the DBP absorption number is within the above-described range, NMP is appropriately attached to a surface of the positive electrode active material. As a result, the positive electrode active material layer may contain an appropriate amount of NMP. When the DBP absorption number is 30 ml/100 g or more, affinity with the nonaqueous electrolytic solution is improved. Therefore, interface resistance with the nonaqueous electrolytic solution can be suppressed to be low, and input and output characteristics of the battery can be improved. In this specification, "DBP absorption number" refers to a value which is obtained by measurement according to JIS K 6217-4 (2008), in which dibutylphthalate (DBP) is used as a reagent liquid.

In another preferred embodiment, particles are used as the positive electrode active material, the hollow structure including: a shell portion; and a hollow portion that is formed in the shell portion. In other words, particles having a hollow structure (hollow particles) are used as the positive electrode active material. In the hollow particles, the hollow portions can hold NMP. Therefore, the hollow particles are preferable from the viewpoint of stably controlling the content of NMP in the positive electrode active material layer to be within an appropriate range. Such a compound having a hollow structure may be commercially available or may be formed using a well-known method of the related art. As a comparative material to the hollow particles, for example, particles having a porous structure (porous particles) are used. Here, the porous structure refers to a structure in which a substantial portion and a porous portion are mixed with each other across all the area of the particle. On the other hand, in the hollow particle, the substantial portion is concentrated on the shell portion, and a clearly divided space is formed in the hollow portion. Therefore, in terms of structure, the particles having a hollow structure are clearly distinguished from the particles having a porous structure.

The shell portion in the hollow particles is formed of the above-described positive electrode active material (for example, a lithium transition metal composite oxide). Typically, the shell portion is in the form of a spherical shell-shaped aggregate of primary particles. In a preferred embodiment, in a sectional image which is obtained by observation with an electron microscope (for example, a scanning electron microscope (SEM)), the shell portion has a shape in which primary particles are arranged in a ring shape (rosary shape).

In a sectional image which is obtained by cutting the hollow particle at a random position and observing the cut section, it is preferable that the proportion of the hollow portion in the total apparent sectional area of the hollow particle is 5% or higher. In a preferred embodiment, the proportion of the hollow portion in the hollow particle is substantially 20% or higher (typically, 30% or higher; for example, 40% or higher). As a result, the liquid holding ability of NMP is improved, and the adjustment of the content of NMP is further promoted. The proportion of the hollow portion in the hollow particle is substantially 85% or lower (typically, 80% or lower; for example, 70% or lower). As a result, mechanical durability of the positive electrode active material layer can be improved. That is, in the battery in which the positive electrode active material satisfying the proportion of the hollow portion is used, high battery performance can be continuously exhibited even when a charging-discharging cycle is repeated. The proportion of the hollow portion in the hollow particle can be obtained, for example, as follows. First, a measurement object (for example, the positive electrode active material layer) containing the hollow particles are embedded with an appropriate resin and is cut (or polished). As a result, a section of each of the hollow particles is obtained. Next, this section is observed with an electron microscope. Next, the obtained sectional image is divided into a shell portion and a hollow portion based on the difference in tone and grey value. Next, a total apparent sectional area $S_T$ of the hollow particle and a sectional area $S_h$ of the hollow portion are obtained. The proportion (%) of the hollow portion can be obtained from a ratio ($S_h/S_T$) of the areas.

In a preferred embodiment, the hollow particle has an opening (throughhole) through a surface of the shell portion. The opening is a portion which passes through the shell portion and spatially connects the hollow portion to the outside of the hollow particle. By providing the opening, the holding of NMP is further promoted. After the construction of the battery, the hollow portion can hold the nonaqueous electrolytic solution. Therefore, in the battery where the positive electrode active material is used, "liquid shortage", that is, shortage of the nonaqueous electrolytic solution is not likely to occur. Accordingly, superior input and output characteristics can be exhibited.

In addition to the positive electrode active material and NMP, the positive electrode active material layer may further contain one material or two or more materials which can be used as components of a positive electrode active material layer in a general nonaqueous electrolyte secondary battery. Examples of the material include a conductive material and a binder. As the conductive material, for example, carbon materials such as carbon blacks (for example, acetylene black and Ketjen black), activated carbon, graphite, and carbon fiber can be preferably used. As the binder, for example, vinyl halide resins such as polyvinylidene fluoride (PVdF) or polyalkylene oxides such as polyethylene oxide (PEO) can be preferably used. In addition, various additives (for example, an inorganic compound that produces gas during overcharge, a dispersant, or a thickener) can be used within a range where the effects of the invention do not significantly deteriorate.

The positive electrode having a configuration in which the positive electrode active material layer is attached to the positive electrode current collector can be prepared, for example, as follows. First, the positive electrode active material and other optional components are mixed with each other in NMP to prepare a slurry-like composition. Next, the prepared composition is applied to a surface of the positive electrode current collector. The composition is heated and dried at a predetermined temperature for a predetermined amount of time to remove a portion of NMP. In other words, the heat drying is finished in a state where a portion of NMP remains in the positive electrode active material layer. As a result, the positive electrode active material layer containing the positive electrode active material and an appropriate amount of NMP can be formed.

When the method of preparing a positive electrode is adopted, for example, the content of NMP in the positive electrode active material layer can be adjusted based on, for example, the characteristics (for example, DBP absorption number or particle structure) of the positive electrode active material to be used and the heat drying conditions (temperature and time). That is, in order to actively cause NMP to remain in the positive electrode active material layer, for example, it is efficient that a positive electrode active material having a high DBP absorption number is used; that a positive electrode active material having a hollow structure is used; that the heat drying temperature is set to be low; and that the heat drying time is reduced. For example, it is preferable that the heat drying temperature is set to be low from the viewpoint of reducing manufacturing costs. In addition, it is preferable that the drying time is reduced from the viewpoint of improving productivity and working efficiency.

In the above description, the method of mixing NMP during the preparation of the composition is shown. However, the invention is not limited to this method. For example, a configuration of forming a positive electrode active material layer (of the related art) containing no NMP and then adding NMP to the positive electrode active material layer with a method such as spraying may also be adopted.

In a preferred embodiment, during the formation of the positive electrode active material layer, a content $A_1$ of NMP per unit mass of the positive electrode active material layer is adjusted to be 33 ppm or higher (for example, 41 ppm or higher; preferably 46 ppm or higher and more preferably 83 ppm or higher). As a result, in the subsequent initial charging, a high-quality film can be stably formed on a surface of the active material. Accordingly, the effects of the invention can be exhibited at a high level. In another preferred embodiment, during the formation of the positive electrode active material layer, the content $A_1$ is adjusted to be 710 ppm or lower (for example, 551 ppm or lower; preferably 512 ppm or lower). That is, it is preferable that the content of NMP is suppressed to be relatively low within a range where the effects of the film formation can be exhibited. As a result, the effects obtained by the addition of NMP can be more effectively exhibited.

NMP to be contained in a member (for example, the positive electrode active material layer) constituting the battery can be obtained as follows. For example, when a measurement object is solid (for example, the positive electrode active material layer), first, the measurement object is cut into a predetermined size to prepare a measurement sample. Next, this measurement sample is dipped in an appropriate solvent (for example, acetone) to extract a NMP component from the solvent. Next, this extract is quantitatively analyzed by gas chromatography-mass spectrometry (GC-MS). The obtained quantitative value is divided by the mass of the sample provided for the measurement (for example, the amount of solid content constituting the positive electrode active material layer; the unit is g). As a result, the content (ppm) of NMP per unit mass of a member (for example, the positive electrode active material layer) constituting the battery can be obtained. For example, when a measurement object is liquid (for example, the nonaqueous electrolytic solution), a predetermined amount of the measurement object may be separated and quantitatively analyzed with a GC-MS as described above.

(b) Negative Electrode

The negative electrode includes a negative electrode active material layer. Typically, the negative electrode includes a negative electrode current collector and a negative electrode active material layer attached to the negative electrode current collector. The negative electrode active material layer contains a negative electrode active material. As the negative electrode current collector, a conductive member formed of highly conductive metal (for example, copper or nickel) can be preferably used.

As the negative electrode active material, one kind or two or more kinds can be appropriately selected and used among various known materials which can be used as a negative electrode active material of a nonaqueous electrolyte secondary battery. Preferable examples of the negative electrode active material include graphite, non-graphitizable carbon (hard carbon), graphitizable carbon (soft carbon), and a carbon material having a combination thereof (for example, amorphous coated graphite). Among these, a graphite-based material in which graphite accounts for 50% or higher with respect to the total mass of the graphite-based material is preferably used from the viewpoint of improving energy density. In general, in the graphite-based material, crystallinity is high, and a portion having high reaction activity called an edge surface is developed. Therefore, the decomposition of the nonaqueous electrolytic solution may be promoted. Accordingly, the application of the invention to the graphite-based material is more efficient.

The form of the negative electrode active material to be used is not particularly limited but, typically, is a particulate form. The average particle size of the negative electrode active material in a particulate form may be 50 μm or less (typically, 1 μm to 20 μm; for example, 5 μm to 15 μm). The specific surface area may be typically 1 $m^2/g$ to 10 $m^2/g$ (for example, 2 $m^2/g$ to 5 $m^2/g$). In this specification, "specific surface area" refers to a value obtained by analyzing a gas adsorption amount using a BET method (for example, a multipoint BET method), the gas adsorption amount being measured using a gas adsorption method (constant-volume adsorption method) in which nitrogen gas is used as an adsorbate.

In addition to the negative electrode active material, the negative electrode active material layer further contains one material or two or more materials which can be used as components of a negative electrode active material layer in a general nonaqueous electrolyte secondary battery. Examples of the material include a binder and a thickener. As the binder, for example, rubbers such as styrene-butadiene rubber (SBR), and polytetrafluoroethylene (PTFE) can be preferably used. As the thickener, for example, celluloses such as carboxymethyl cellulose (CMC) or methyl cellulose (MC) can be preferably used. In addition, various other additives (for example, a dispersant or a conductive material) can be used within a range where the effects of the invention do not significantly deteriorate.

(c) Nonaqueous Electrolytic Solution

The nonaqueous electrolytic solution contains an oxalato complex compound. Typically, the nonaqueous electrolytic solution contains a supporting electrolyte, an oxalato complex compound, and a nonaqueous solvent. As the nonaqueous solvent, various organic solvents which can be used in a nonaqueous electrolytic solution for a general nonaqueous electrolyte secondary battery can be used. Examples of the solvent include carbonates, ethers, esters, nitriles, sulfones, and lactones. Preferable examples of the solvent include carbonates such as ethylene carbonate (EC), propylene carbonate (PC), diethyl carbonate (DEC), dimethyl carbonate (DMC), and ethyl methyl carbonate (EMC). As the supporting electrolyte, one kind or two or more kinds can be appropriately selected and used among various known materials which can be used as a supporting electrolyte of a general nonaqueous electrolyte secondary battery. Preferable examples of the supporting electrolyte include lithium salts such as $LiPF_6$, $LiBF_4$, or $LiClO_4$. Among these, $LiPF_6$ is preferable.

As the oxalato complex compound, one kind or a combination of two or more kinds selected from oxalato complex compounds produced using various well-known methods and various generally available oxalato complex compounds can be used without any particular limitation. The oxalato complex compound is a complex which is formed by at least one oxalate ion ($C_2O_4^{2-}$) forming a coordinate bond with a central element (coordinating atom). Examples of the central element include metalloid elements represented by boron (B) and phosphorus (P). Specific examples of the oxalato complex compound include (i) a compound having a tetracoordinate structure in which at least one oxalate ion ($C_2O_4^{2-}$) is coordinated to boron (B) as a central atom; and (ii) a compound having a hexacoordinate structure in which at least one oxalate ion ($C_2O_4^{2-}$) is coordinated to phosphorus (P) as a central atom. Among these, a compound containing the same cation species (charge carrying ion) as that of the supporting electrolyte is particularly preferable.

Preferable examples of (i) include lithium bis(oxalato) borate ($Li[B(C_2O_4)_2]$; LiBOB) and lithium difluoro(oxalato) borate ($Li[BF_2(C_2O_4)]$). Preferable examples of (ii) include lithium bis(oxalato)phosphate ($Li[P(C_2O_4)_3]$), and lithium difluorobis(oxalato)phosphate ($Li[PF_2(C_2O_4)_2]$; LPFO), and lithium tetrafluoro(oxalato)phosphate ($Li[PF_4(C_2O_4)]$). Among these, LiBOB or LPFO is preferable from the viewpoint of forming a film having superior high-temperature durability. In particular, LiBOB is preferable.

The concentration of the oxalato complex compound in the nonaqueous electrolytic solution may be adjusted based on, for example, the kind and characteristics (for example, particle size or specific surface area) of an object (that is, the active material) on which a film is to be formed. In a preferred embodiment, a content $B_1$ (mol/kg) of the oxalato complex compound per unit mass of the negative electrode active material is adjusted to be 0.0258 mol/kg to 0.1378 mol/kg. By determining the content per unit mass of the negative electrode active material, a decrease in durability caused by an insufficient amount of a film or an increase in resistance caused by an excess amount of a film can be prevented. That is, by adjusting the content $B_1$ of the oxalato complex compound to be within the above-described range, an appropriate amount of a film can be stably (accurately) formed on a surface of the active material. As a result, the decomposition of the nonaqueous electrolytic solution can be suppressed at a high level.

The nonaqueous electrolytic solution may further contain various additives as long as the effects of the invention do not significantly deteriorate. These additives are used for the purposes including: improvement of cycle characteristics of a battery; improvement of high-temperature storage characteristics; improvement of an initial charge-discharge efficiency; improvement of input and output characteristics; and improvement of overcharge resistance (an increase in the amount of gas produced during overcharge). Specific examples of the additives include vinylene carbonate (VC), vinyl ethylene carbonate (VEC), biphenyl (BP), and cyclohexylbenzene (CHB).

<(2) Battery Assembly Construction Step>

In the battery assembly construction step, a battery assembly is constructed using the positive electrode, the negative electrode, and the nonaqueous electrolytic solution. Typically, first, the positive electrode, the negative electrode, and an insulating layer are laminated to face each other with the insulating layer interposed therebetween to prepare an electrode body. As the insulating layer, typically, a separator can be used. Preferable examples of the separator include a porous resin sheet formed of a resin such as polyethylene (PE) or polypropylene (PP). Next, this electrode body is accommodated in a battery case. As the battery case, a battery case formed of a light metal material such as aluminum can be preferably used. Next, the nonaqueous electrolytic solution is injected into the battery case.

In the method disclosed herein, the battery assembly is constructed such that the following expression of $0.000036 \leq B_1/A_1 \leq 0.001048$ is satisfied, where $A_1$ (ppm) represents a content of NMP per unit mass of the positive electrode active material layer, and $B_1$ (mol/kg) represents a content of the oxalato complex compound per unit mass of the negative electrode active material. It is preferable that the battery assembly is constructed such that $A_1$ and $B_1$ satisfy the following expression of $0.000054 \leq B_1/A_1 \leq 0.000289$. By adjusting $B_1/A_1$ to be within the above-described range, the effects obtained by the addition of NMP are preferably exhibited. That is, in the subsequent initial charging step, a high-quality (for example, low-resistance and high-durability) film can be formed on a surface of the active material.

<Battery Assembly>

In the steps (1) and (2), the battery assembly is prepared. The respective components (positive electrode, negative electrode, and nonaqueous electrolytic solution) constituting the battery assembly are as described above. However, in the battery assembly, in the step (1), a portion of NMP contained in the positive electrode active material layer can be eluted to the nonaqueous electrolytic solution. In particular, NMP, which is attached (adsorbed) to a surface of the positive electrode active material layer in a thickness direction (a portion most distant from the positive electrode current collector), is likely to be eluted from the positive electrode active material layer due to contact with the nonaqueous electrolytic solution. Accordingly, in the battery assembly, a content $A_2$ (ppm) of NMP per unit mass of the positive electrode active material layer may be substantially equal to or lower than $A_1$. That is, $A_2$ may be 95% or lower (typically, 90% or lower; for example, 80% or lower) with respect to $A_1$. In a preferred embodiment, $A_2$ is 675 ppm or lower, preferably 639 ppm or lower, and more preferably 568 ppm or lower. As a result, the effects obtained by the addition of NMP can be more effectively exhibited.

As described above, in the step (1), NMP attached to the surface of the positive electrode active material layer is likely to be eluted to the nonaqueous electrolytic solution. On the other hand, for example, NMP attached to a portion of the positive electrode active material layer close to the positive electrode current collector or NMP remaining in the hollow portions of the particles having a hollow structure is likely to remain in the positive electrode active material layer without being eluted to the nonaqueous electrolytic solution. Therefore, for example, when the positive electrode active material layer is equally divided into five regions in the thickness direction (laminating direction) and a content $A_{2'}$ of NMP in each of the five regions is obtained, the content of NMP per unit mass in one of the five regions which is most distant from the negative electrode (region which is closest to the positive electrode current collector) may be substantially equal to $A_1$ (for example, $A_{2'}=A_1$). As a result, the effects obtained by the addition of NMP can be more effectively exhibited.

In another preferred embodiment, $A_2$ is 50% or higher (typically, 60% or higher; for example, 70% or higher) with respect to $A_1$. In other words, $A_2$ is 16 ppm or higher, preferably 20 ppm or higher, and more preferably 23 ppm or higher (for example, 50 ppm or higher, 100 ppm or higher, 200 ppm or higher, and in particular, 300 ppm or higher). As a result, in the initial charging step described below, NMP can be efficiently oxidized and decomposed. Accordingly, the effects of the invention can be exhibited at a high level.

In a preferred embodiment, in the battery assembly, a content $B_2$ (mol/kg) of the oxalato complex compound per unit mass of the negative electrode active material is substantially equal to $B_1$. That is, in the battery assembly disclosed herein, $A_2$ (ppm) and $B_2$ (mol/kg) may satisfy the following expression of $0.000036 \leq B_2/A_2 \leq 0.001048$. Typically, $A_{2'}$ (ppm) and $B_2$ (mol/kg) may satisfy the following expression of $0.000036 \leq B_2/A_{2'} \leq 0.001048$. The content of the oxalato complex compound in the nonaqueous electrolytic solution can be obtained, for example, as follows. First, the nonaqueous electrolytic solution is collected in an inert atmosphere. Next, the nonaqueous electrolytic solution is analyzed by, for example, GC-MS, liquid chromatography-mass spectrometry (LC-MS), or ion chromatography (IC). As a result, the amount (mol) of the oxalato complex compound contained in the battery assembly can be obtained by qualitatively and quantitatively analyzing chemical species (for example, B, P, or $C_2O_4^{2-}$) derived from the oxalato complex compound. By dividing the obtained value by the mass (kg) of the negative electrode active material contained in the battery assembly, the content of the oxalato complex compound per unit mass of the negative electrode active material can be calculated.

In this specification, "battery assembly" refers to an assembly in which the above-described components (that is, the positive electrode, the negative electrode, and the nonaqueous electrolytic solution) constituting the battery are combined, that is, an assembly which is fabricated before the initial charging step. For example, at this time, a lid of the battery case and an injection hole of the electrolytic solution may be sealed or may not be sealed.

<(3) Initial Charging Step>

In the initial charging step, the battery assembly is initially charged at least once. The charging is performed at least until NMP and the oxalato complex compound are electrically decomposed. In other words, during charging, the maximum achieved potential is set to be higher than the redox potential of NMP and the oxalato complex compound. For example, in a battery assembly having a voltage of 4.2 V when being fully charged by using a carbon material as the negative electrode active material, the maximum achieved voltage is adjusted to be approximately 3 V or higher, for example, 3.5 V to 4.2 V. The charging rate may be, for example, 0.1 C to 10 C and preferably about 0.2 c to 2 C. The charging may be performed once or may be performed two times or more, for example, while performing discharging therebetween. After being charged, the battery assembly may be held (left to stand) in a high-temperature environment of, for example, 40° C. or higher for a certain period of time.

Through the initial charging, the oxalato complex compound and NMP are electrically decomposed. Typically, the oxalato complex compound is reduced and decomposed on the negative electrode. Typically, NMP is oxidized and decomposed on the positive electrode. A decomposition product of NMP moves to the negative electrode side through the nonaqueous electrolytic solution. As a result, a film containing a component derived from the oxalato complex compound and a component derived from NMP is formed on a surface of the negative electrode active material. In a preferred embodiment, a portion of the decomposition product of the oxalato complex compound moves to the positive electrode side through the nonaqueous electrolytic solution. Therefore, a film containing the two components is also formed on a surface of the positive electrode active material. As a result, a film containing a component derived from the oxalato complex compound and a component derived from NMP may also be formed on a surface of the positive electrode active material.

<Nonaqueous Electrolyte Secondary Battery>

In this way, a nonaqueous electrolyte secondary battery can be manufactured, the battery including: the positive electrode; the negative electrode; and the nonaqueous electrolytic solution. The negative electrode of the nonaqueous electrolyte secondary battery includes the negative electrode active material layer containing the negative electrode active material. The negative electrode active material includes a film. The film contains a component derived from the oxalato complex compound and a component derived from NMP. That is, as the component derived from the oxalato complex compound, the film may contain, for example, lithium ions ($Li^+$), oxalate ions ($C_2O_4^{2-}$), boron (B), and/or phosphorus (P). For example, when LiBOB is used as the oxalato complex compound, the film may contain a component having a coordination number of 3 such as boron ($B^{3+}$), $Li^+$, $B(C_2O_4)^+$, $C_2O_4^{2-}$, or $COO^-$. As the component derived from NMP, the film may contain, for example, a carbonyl group ($C(=O)^-$) or nitrogen (N). Due to the film, the surface of the negative electrode active material (typically, graphite-based material) is stabilized. As a result, even when a long-term charging-discharging cycle is repeated or when the battery is exposed to a severe environment such as a high-temperature environment, the reduction decomposition of the nonaqueous electrolyte can be suppressed at a high level. As a result, superior long-term durability can be realized.

This effect of improving durability is obtained by initially charging the battery assembly in a state where the battery assembly contains the two components (the component derived from the oxalato complex compound and the component derived from NMP). The mechanism is not clear but is presumed to be that a high-quality (high-durability) film is formed on a surface of the negative electrode active material by the above-described component derived from the oxalato complex compound and the above-described component derived from NMP being bonded to each other (for example, being polymerized). Accordingly, for example, when only one of the oxalato complex compound and NMP is used, the effects of the invention cannot be obtained. On the contrary, for example, when only NMP is used, durability may deteriorate.

The film of the negative electrode active material containing the two components can be verified, for example, by analyzing the film on the surface of the negative electrode active material. Specifically, first, the battery is disassembled in an inert atmosphere to extract the negative electrode. This negative electrode is washed with an appropriate solvent (for example, EMC) and is cut into an appropriate size to obtain a measurement sample. Next, a film component on the surface is extracted with an appropriate solvent. Next, this extract is analyzed with a method such as GC-MS, LC-MS, IC, X-ray absorption fine structure spectroscopy (XAFS), or inductively coupled plasma-atomic emission spectrometry (ICP-AES). This analysis method may be appropriately selected based on the kind of an element which is a measurement object. Chemical species derived from the decomposition products of the oxalato complex compound and NMP can be determined by qualitatively and quantitatively analysis. For example, when the component derived from the oxalato complex compound is measured, the obtained measurement sample is dipped in ion exchange water for a predetermined amount of time (for example, several minutes to several tens of minutes). As a result, a film component as a measurement object is extracted in the solvent. This extract is analyzed by, for example, IC, XAFS, or ICP-AES.

At least a portion of NMP added during the battery construction is used for the formation of the film. Therefore, in the nonaqueous electrolyte secondary battery, the positive electrode active material layer may or may not contain NMP. That is, a content $A_3$ (ppm) of NMP per unit mass of the positive electrode active material layer is lower than $A_1$ and, typically, lower than $A_2$. $A_3$ may be about 50% or lower (typically, 40% or lower; for example, 30% or lower) with respect to $A_1$. In a preferred embodiment, $A_3$ is 355 ppm or lower, preferably 284 ppm or lower, and more preferably 213 ppm or lower. $A_3$ may be about 0 ppm.

In a preferred embodiment, in the nonaqueous electrolyte secondary battery, the positive electrode active material layer contains NMP. That is, the content $A_3$ of NMP per unit mass of the positive electrode active material layer may be, for example, 5% or higher (typically, 10% or higher; for example, 20% or higher) with respect to $A_1$. In other words, $A_3$ is 2 ppm or higher, preferably 3 ppm or higher, and more preferably 7 ppm or higher (for example, 10 ppm or higher, 20 ppm or higher, 50 ppm or higher, and in particular, 100 ppm or higher).

At least a portion of the oxalato complex compound added during the battery construction is used for the formation of the film. Therefore, in the nonaqueous electrolyte secondary battery, the nonaqueous electrolytic solution may or may not contain the oxalato complex compound. In a preferred embodiment, in the nonaqueous electrolyte secondary battery, the nonaqueous electrolytic solution contains the oxalato complex compound (which may be in the form of, for example, oxalato complex ions).

When NMP remains in the positive electrode active material layer, and when the oxalato complex compound remains in the nonaqueous electrolytic solution, a new film can be formed during the use of the battery. That is, when an unexpected situation such as the cracking of the negative electrode active material or the peeling of the negative electrode active material layer occurs due to repeated charging-discharging cycles, a new film can be formed on the exposed surface of the negative electrode (negative electrode active material). Therefore, the effects of the invention can be exhibited at a higher level.

<Embodiment of Nonaqueous Electrolyte Secondary Battery>

Although not particularly limited, hereinafter, a nonaqueous electrolyte secondary battery (single cell) according to an embodiment of the invention will be described below as an example with reference to the accompanying drawings. In the following drawings, parts or portions having the same function are represented by the same reference numerals, and the repeated description will not be made or will be simplified. In each drawing, a dimensional relationship (for example, length, width, or thickness) does not necessarily reflect the actual dimensional relationship.

FIG. 1 is an exploded vertical sectional view schematically showing a sectional structure of a nonaqueous electrolyte secondary battery 100 according to the embodiment of the invention. In the nonaqueous electrolyte secondary battery 100, a wound electrode body 80, which is wound in a flat shape, and a nonaqueous electrolytic solution (not shown) are accommodated in a flat rectangular battery case 50. The battery case 50 includes: a flat rectangular battery case body 52 having an open upper end; and a lid 54 that covers the opening. In a top surface (that is, the lid 54) of the battery case 50, a positive electrode terminal 70 for external connection, which is electrically connected to the positive electrode of the wound electrode body 80, and a negative electrode terminal 72, which is electrically connected to the negative electrode of the wound electrode body 80, are provided. The lid 54 further includes a safety valve 55 for discharging gas, produced from the inside of the battery case 50, to the outside of the battery case 50.

In the battery case 50, the flat wound electrode body 80 and the nonaqueous electrolytic solution (not shown) are accommodated. The wound electrode body 80 is obtained by laminating an elongated positive electrode sheet 10, an elongated separator sheet 40, and an elongated negative electrode sheet 20 and winding the laminate in a flat shape. The positive electrode sheet 10 includes: an elongated positive electrode current collector; and a positive electrode active material layer 14 that is formed on a surface (typically, on both surfaces) of the positive electrode current collector in the longitudinal direction. The negative electrode sheet 20 includes: an elongated negative electrode current collector; and a negative electrode active material layer 24 that is formed on a surface (typically, on both surfaces) of the negative electrode current collector in the longitudinal direction. The two elongated separator sheets 40 are arranged between the positive electrode active material layer 14 and the negative electrode active material layer 24 as an insulating layer.

A winding core portion is formed in the center of the wound electrode body 80 in a width direction which is defined as a direction moving from one end portion to another end portion in the winding axial direction, the winding core portion having a configuration in which the positive electrode active material layer 14, which is formed on the surface of the positive electrode current collector, and the negative electrode active material layer 24, which is formed on the surface of the negative electrode current collector, are laminated. In addition, at end portions of the wound electrode body 80 in the winding axial direction, a positive electrode active material layer non-forming portion of the positive electrode sheet 10 and a negative electrode active material layer non-forming portion of the negative electrode sheet 20 protrude from the winding core portion to the outside, respectively. A positive electrode current collector plate is provided in the protrusion on the positive electrode side, and a negative electrode current collector plate is provided in the protrusion on the negative electrode side. The positive electrode current collector plate and the negative electrode current collector plate are electrically connected to the positive electrode terminal 70 and the negative electrode terminal 72, respectively.

<Use of Nonaqueous Electrolyte Secondary Battery>

The nonaqueous electrolyte secondary battery disclosed herein can be used for various applications and exhibits superior long-term durability due to the effect obtained by a high-quality film formed on the surface of the active material. In particular, the nonaqueous electrolyte secondary battery exhibits superior high-temperature storage characteristics. For example, even when a charging-discharging cycle is repeated, a decrease in capacity is small. Accordingly, taking advantage of the superior characteristics, the nonaqueous electrolyte secondary battery can be preferably used, in particular, in an application where a usage environment or a storage environment is at a high temperature of 50° C. or higher; or in an application where a battery is used for a long period of time without being replaced with another one. Examples of the applications include power supplies for driving a motor mounted in a vehicle such as a plug-in hybrid vehicle, a hybrid vehicle, or an electric vehicle. Accordingly, according to another aspect of the invention, there is provided a vehicle including any one of the nonaqueous electrolyte secondary batteries disclosed herein. Typically, this nonaqueous electrolyte secondary battery may be used in the form of a battery pack in which plural secondary batteries are connected to each other in series and/or in parallel.

Hereinafter, several examples relating to the invention will be described, but the specific examples are not intended to limit the invention.

I. Test Examples in which LiBOB was Used as Oxalato Complex Compound

<Preparation of Positive Electrode>

First, 13 positive electrodes which were different from each other only in the content of N-methyl-2-pyrrolidone (NMP) were prepared. Specifically, $LiNi_{1/3}Co_{1/3}Mn_{1/3}O_2$ (NCM) particles were prepared as a positive electrode active material. The positive electrode active material particles had a hollow structure. The positive electrode active material particles had an average particle size of about 6 μm. The positive electrode active material particles (NCM); acetylene black (AB) as a conductive material; and polyvinylidene fluoride (PVdF) as a binder were weighed such that a mass ratio (NCM:AB:PVdF) of the materials was 90:8:2. The weighed materials were kneaded with NMP to prepare a slurry-like composition. The composition was applied in a belt shape to an elongated aluminum foil (positive electrode current collector). With C1 as a reference, the composition was heated and dried under conditions (temperature and time) shown in Table 1 of FIG. 3. After being heated and dried, the composition was roll-pressed to prepare a positive electrode sheet (C1 to C13) in which a positive electrode active material layer was formed on both surfaces of the positive electrode current collector.

<Measurement of Content of NMP>

The content of NMP in the prepared positive electrode was measured. Specifically, first, the positive electrode active material layer was punched into three pieces using a puncher having a diameter of 40 mm. Using ceramic scissors, each of the pieces was cut into a size of 5 mm×5 mm to prepare a measurement sample. Next, this measurement sample was put into a sample tube, and 2 mL of acetone was put thereinto. Next, an opening of the sample tube was wound with a sealing tape to be sealed and then was vibrated with ultrasonic waves for 30 minutes. As a result, NMP was extracted in acetone. Next, this extract was put into a screw vial for GC-MS while being filtered with a syringe filter.

Next, the NMP was quantitatively measured by GC-MS under the following conditions.

Column: DB-WAXETR (manufactured by Agilent Technologies Inc., length: 30 m, inner diameter: 0.25 mm, thickness: 0.25 μm)
Vaporizing chamber temperature: 240° C.
Injection Amount: 1 μL
Measurement mode: selected ion monitoring (SIM) mode
Measurement fragment ion: m/z99

The obtained quantitative value (g) was divided by the mass (g) of the sample provided for the measurement to obtain the content (ppm) of NMP per unit mass of the positive electrode active material layer. The results are shown in Table 1 of FIG. 3.

As shown in Table 1 of FIG. 3, as the heat drying temperature decreased and/or as the heat drying time decreased, the content of NMP remaining in the positive electrode active material layer increased. In other words, in the test examples, the content of NMP in the positive electrode active material layer was adjusted by adjusting the heat drying conditions (temperature and time).

<Preparation of Negative Electrode>

Next, the negative electrode was prepared. Specifically, first, graphite particles (C) were prepared as the negative electrode active material. The negative electrode active material particles had an average particle size of 10 μM and a specific surface area of about 4 $m^2$/g. The graphite particles (C); styrene-butadiene rubber (SBR) as a binder; and carboxymethyl cellulose (CMC) as a thickener were weighed such that a mass ratio (C:SBR:CMC) thereof was 98:1:1. The weighed materials were kneaded with ion exchange water to prepare a slurry-like composition. The composition was applied in a belt shape to an elongated copper foil (negative electrode current collector). After being heated and dried, the composition was roll-pressed to prepare a negative electrode sheet in which a negative electrode active material layer was formed on both surfaces of the negative electrode current collector.

<Preparation of Nonaqueous Electrolytic Solution>

Next, 10 nonaqueous electrolytic solutions which were different from each other in the content of the oxalato complex compound were prepared. Specifically, first, a mixed solvent containing ethylene carbonate (EC), dimethyl carbonate (DMC), and ethyl methyl carbonate (EMC) at a volume ratio (EC:DMC:EMC) of 3:4:3 was prepared. $LiPF_6$ as a supporting electrolyte was dissolved in the mixed solvent at a concentration of 1.1 mol/L, and then lithium bis(oxalato)borate (LiBOB) as an oxalato complex compound was dissolved therein. In this way, nonaqueous electrolytic solutions (E1 to E10) which were different from each other in the content of LiBOB were prepared.

<Construction of Battery Assembly>

Next, each of the prepared positive electrode sheets (C1 to C13) and the negative electrode sheet were laminated with a separator sheet interposed therebetween. As a result, 13 electrode bodies corresponding to the positive electrode sheets C1 to C13 were prepared. Next, as a separator sheet, a porous resin sheet having a three-layer structure in which a polypropylene (PP) layer was laminated on both surfaces of a polyethylene (PE) layer was used. Next, each of the electrode bodies was accommodated in a battery case. Next, the nonaqueous electrolytic solution was injected into the battery case. Here, 130 battery assemblies in total were constructed by combining the prepared 13 electrode bodies with the prepared 10 nonaqueous electrolytic solutions. Regarding the construction of each of the battery assemblies, a ratio ($B_1/A_1$) of the content $B_1$ (mol/kg) of LiBOB per unit mass of the negative electrode active material to the content $A_1$ (ppm) of NMP per unit mass of the positive electrode active material layer is shown in Table 2 of FIG. 4.

<Initial Charging>

In a temperature environment of 25° C., each of the battery assemblies was initially charged. Specifically, first, the battery assembly was charged at a constant current of ⅓ C (CC charging) until the voltage between positive and negative electrode terminals reached 4.1 V. Next, the operation was stopped for 10 minutes. Next, the battery assembly was discharged at a constant current of ⅓ C (CC discharging) until the voltage between positive and negative electrode terminals reached 3.0 V. Next, the battery assembly was discharged at a constant voltage (CV discharging) for a total discharging time of 1.5 hours. Next, the operation was stopped for 10 minutes. This charging discharging pattern was set as one cycle, and this cycle was repeated three times in total. Due to the charging and discharging, a film containing a component derived from LiBOB and a component derived from NMP was formed on a surface of the negative electrode active material. In this way, a nonaqueous electrolyte secondary battery was prepared. When the CCCV discharge capacity after three cycles was calculated as an initial capacity, the initial capacity was the same (about 4 Ah) as the theoretical capacity in all the battery assemblies.

<High-Temperature Storage Test>

Figure 2:
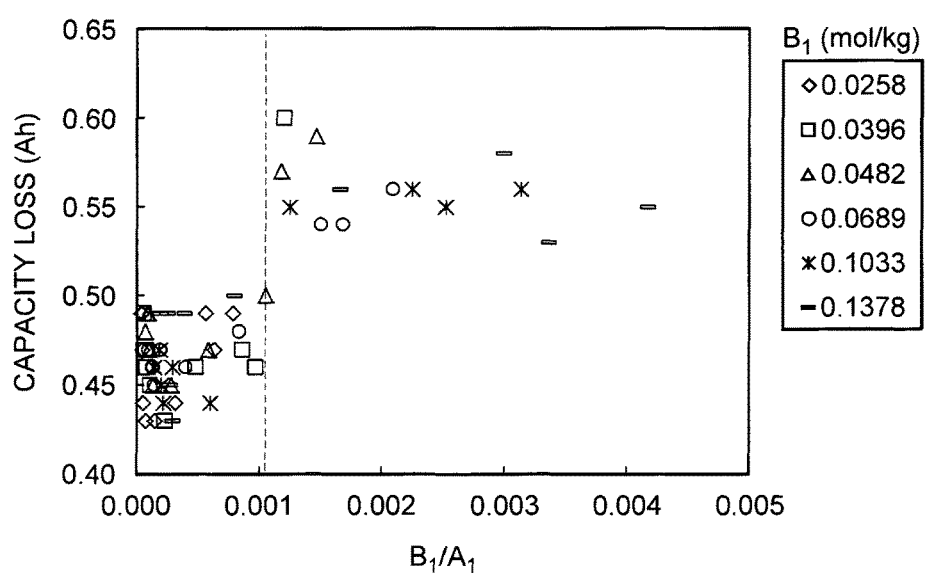
FIG. 2 is a graph showing a relationship between $B_1/A_1$ and a capacity loss after a high-temperature storage.

In a temperature environment of 25° C., the state of charge (SOC) of each of the prepared batteries was adjusted to 80%. Next, the battery was stored (left to stand) in a thermostatic chamber at 60° C. for 60 days. After 60 days, the battery was pulled out from a thermostatic chamber, and the battery capacity thereof was measured with the same charging discharging pattern as that during the initial charging. The capacity loss (Ah) was obtained by subtracting the battery capacity after the high-temperature storage from the initial capacity. The results are shown in Table 3 of FIG. 5. FIG. 2 shows a relationship between $B_1/A_1$ and the capacity loss after the high-temperature storage in regions of Tables 2 and 3 of FIGS. 4 and 5 surrounded by thick lines (that is, regions satisfying 33 ppm≤$A_1$≤710 ppm and 0.0258 mol/kg≤$B_1$≤0.1378 mol/kg).

As shown in FIG. 2, when 0.000036≤$B_1/A_1$≤0.001048 was satisfied, the capacity loss was suppressed to be low. In other words, even after the battery was exposed to a severe environment for a long period of time (even after the battery was exposed to a high-temperature environment of 60° C. in SOC 80% for 60 days), a decrease from the initial capacity was small. That is, the capacity retention was high. In this way, in the nonaqueous electrolyte secondary battery disclosed herein, high durability (for example, high-temperature durability) is exhibited. The above results show the technical significance of the invention.

II. Test Examples in which LPFO was Used as Oxalato Complex Compound

Here, lithium difluorobis(oxalato)phosphate (LPFO) was used as the oxalato complex compound. Specifically, nonaqueous electrolytic solutions (E11 to E14) which were different from each other in the content of LPFO were prepared using the same method as in the preparation of nonaqueous electrolytic solution of "I." described above. Next, 12 battery assemblies in total were constructed by combining the 3 electrode bodies (C7, C10, C13) prepared above in "I." with the prepared 4 nonaqueous electrolytic solutions. Nonaqueous electrolyte secondary batteries were prepared using the same method as in "I." described above, and battery characteristics thereof were evaluated. Regarding the construction of each of the battery assemblies, $B_1/A_1$ is shown in Table 4 of FIG. 6. The results of the high-temperature storage test are shown in Table 5 of FIG. 7. In Tables 4 and 5, as in the case of Tables 2 and 3, regions satisfying 33 ppm≤$A_1$≤710 ppm and 0.0258 mol/kg≤$B_1$≤0.1378 mol/kg are surrounded by thick lines.

In a comparison between Tables 2 and 3 and Tables 4 and 5, even when LPFO was used as the oxalato complex compound, the same results as in the case where LiBOB was used as the oxalato complex compound were obtained. Therefore, it was found that the technique disclosed herein is not limited by the kind of the oxalato complex compound. It is considered that the same effects are exhibited irrespective of whether the central element of the oxalato complex compound is boron (B) or phosphorus (P).

Hereinabove, specific examples of the invention have been described in detail. However, these examples are merely exemplary and do not limit the claims. The technique described in the claims includes various modifications and alternations of the above-described specific examples.

What is claimed is:

1. A method of manufacturing a nonaqueous electrolyte secondary battery, the method comprising:
    preparing a positive electrode that includes a positive electrode active material layer containing a positive electrode active material and N-methyl-2-pyrrolidone, a negative electrode that includes a negative electrode active material layer containing a negative electrode active material, and a nonaqueous electrolytic solution that contains an oxalato complex compound;
    constructing a battery assembly using the positive electrode, the negative electrode, and the nonaqueous electrolytic solution; and
    initially charging the battery assembly, wherein
    the negative electrode active material contains a carbon material,
    the battery assembly is constructed such that a following expression of 0.000036≤$B_1/A_1$≤0.001048 is satisfied, where $A_1$ ppm represents a content of N-methyl-2-pyrrolidone per unit mass of the positive electrode active material layer, and $B_1$ mol/kg represents a content of the oxalato complex compound in the nonaqueous electrolytic solution per unit mass of the negative electrode active material,
    $A_1$ is 33 ppm to 710 ppm,
    $B_1$ is 0.0258 mol/kg to 0.1378 mol/kg.
2. The method according to claim 1, wherein
    particles having a hollow structure are used as the positive electrode active material, the hollow structure including: a shell portion; and a hollow portion that is formed in the shell portion.
3. The method according to claim 1, wherein
    at least one of lithium bis(oxalato)borate and lithium difluorobis(oxalato)phosphate is used as the oxalato complex compound.
4. A battery assembly comprising:
    a positive electrode that includes a positive electrode active material layer containing a positive electrode active material and N-methyl-2-pyrrolidone;
    a negative electrode that includes a negative electrode active material layer containing a negative electrode active material; and
    a nonaqueous electrolytic solution that contains an oxalato complex compound, wherein
    the negative electrode active material contains a carbon material, a following expression of $0.000036 \leq B_2/A_{2'} \leq 0.001048$ is satisfied, where $A_{2'}$ ppm represents a content of N-methyl-2-pyrrolidone per unit mass in one of five regions which is most distant from the negative electrode, the five regions being equally divided from the positive electrode active material layer in a thickness direction, and $B_2$ mol/kg represents a content of the oxalato complex compound per unit mass of the negative electrode active material, $A_{2'}$ is 33 ppm to 710 ppm, and $B_2$ is 0.0258 mol/kg to 0.1378 mol/kg.

5. A nonaqueous electrolyte secondary battery comprising:

a positive electrode that includes a positive electrode active material layer containing a positive electrode active material;

a negative electrode that includes a negative electrode active material layer containing a negative electrode active material; and a nonaqueous electrolytic solution, wherein the negative electrode active material contains a carbon material, the negative electrode active material includes a film, the film contains a component derived from an oxalato complex compound and a component derived from N-methyl-2-pyrrolidone, before an initial charging, the positive electrode active material contains N-methyl-2-pyrrolidone, the nonaqueous electrolytic solution contains the oxalato complex compound, $A_{2'}$ is 33 ppm to 710 ppm, $B_2$ is 0.0258 mol/kg to 0.138 mol/kg, where $A_2'$ ppm represents a content of N-methyl-2-pyrrolidone per unit mass in one of five regions which is most distant from the negative electrode, the five regions being equally divided from the positive electrode active material layer in a thickness direction, and $B_2$ mol/kg represents a content of the oxalato complex compound per unit mass of the negative electrode active material, the component derived from the oxalato complex compound contains at least one of lithium ion, oxalate ions, boron, and phosphorus, and the component derived from N-methyl-2-pyrrolidone contains at least one carbonyl group and nitrogen.

6. The nonaqueous electrolyte secondary battery according to claim 5, wherein the positive electrode active material layer contains N-methyl-2-pyrrolidone, and the nonaqueous electrolytic solution contains the oxalato complex compound.

7. The nonaqueous electrolyte secondary battery according to claim 5, wherein the positive electrode active material has a hollow structure including: a shell portion; and a hollow portion that is formed in the shell portion.

* * * * *